United States Patent [19]
Gist

[11] Patent Number: 5,996,773
[45] Date of Patent: Dec. 7, 1999

[54] FLUID DRIVE FOR RECIPROCATING FLOOR

[76] Inventor: Richard T. Gist, 4375 North West St., Tulare, Calif. 93274

[21] Appl. No.: 09/020,087

[22] Filed: Feb. 6, 1998

[51] Int. Cl.$^6$ .................................................. B65G 25/00
[52] U.S. Cl. .................................... 198/750.5; 198/750.7; 198/750.4; 414/525.1; 414/525.9
[58] Field of Search .............................. 198/750.5, 750.7, 198/750.4; 414/525.1, 525.9

[56] References Cited

U.S. PATENT DOCUMENTS

| | | | |
|---|---|---|---|
| 5,096,356 | 3/1992 | Foster | 414/525.1 |
| 5,193,661 | 3/1993 | Foster | 198/750.5 |
| 5,560,472 | 10/1996 | Gist | 198/750.4 |

*Primary Examiner*—William E. Terrell
*Assistant Examiner*—Mark A. Deuble
*Attorney, Agent, or Firm*—Dennis B. Haase

[57] ABSTRACT

An enclosed fluid drive system for cycling the beams in a reciprocating floor between a reset position and a delivery position wherein an array of fluid motors engages the beams for moving the same and the fluid drive system includes an exhaust system wherein the various fluid motors are sequentially exhausted to move the beams from their delivery position to a reset position in sequence. The fluid motors each include a piston and a piston rod which is slidably supported within a passage in an end cap at one end of the motor cylinder. Each end cap and piston rod together form an integral part of the exhaust system which allows the fluid motors to be sequentially exhausted.

17 Claims, 6 Drawing Sheets

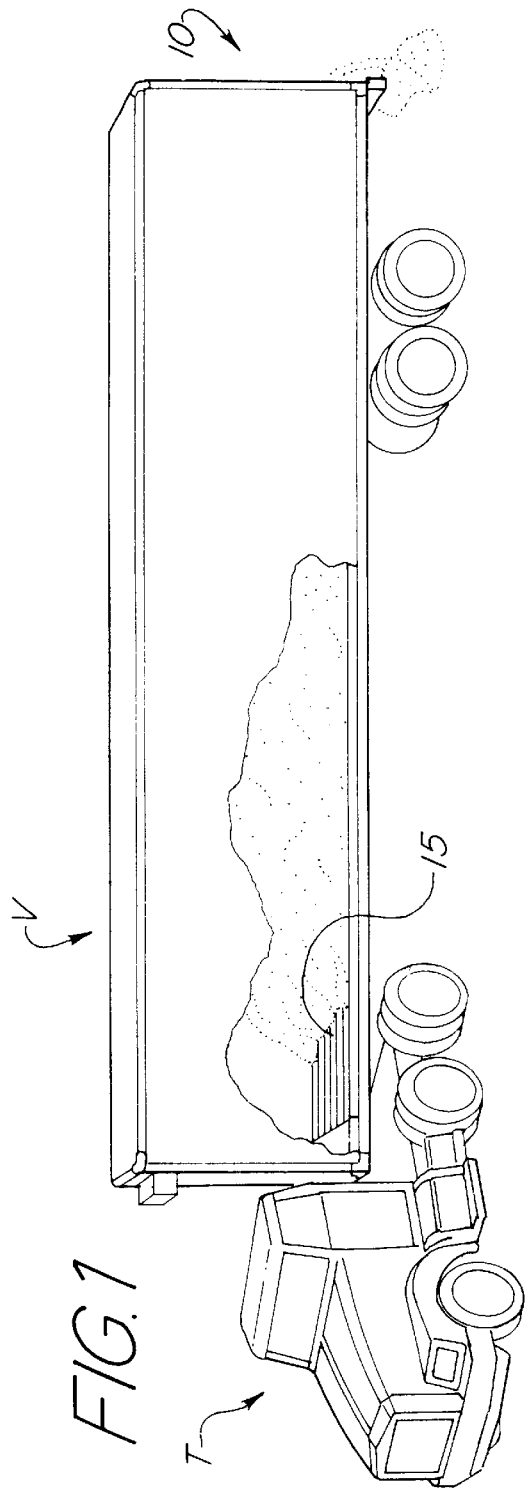
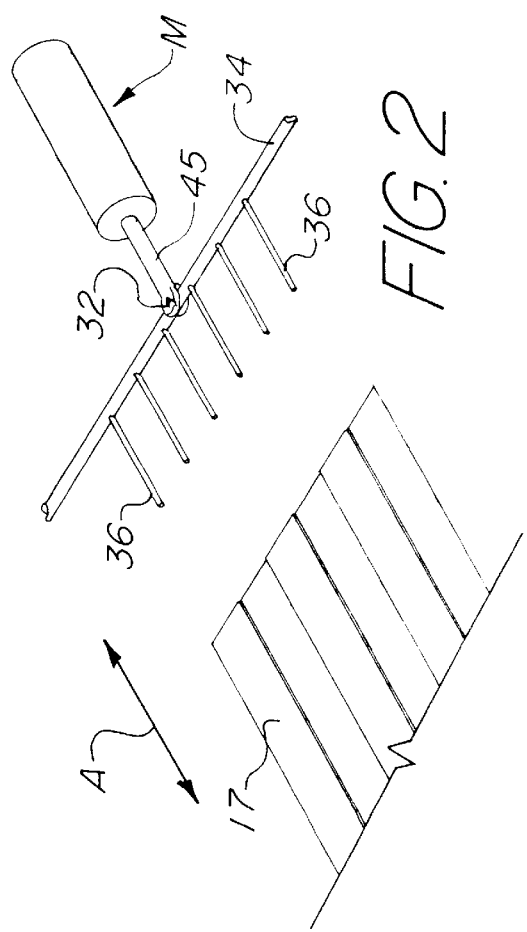

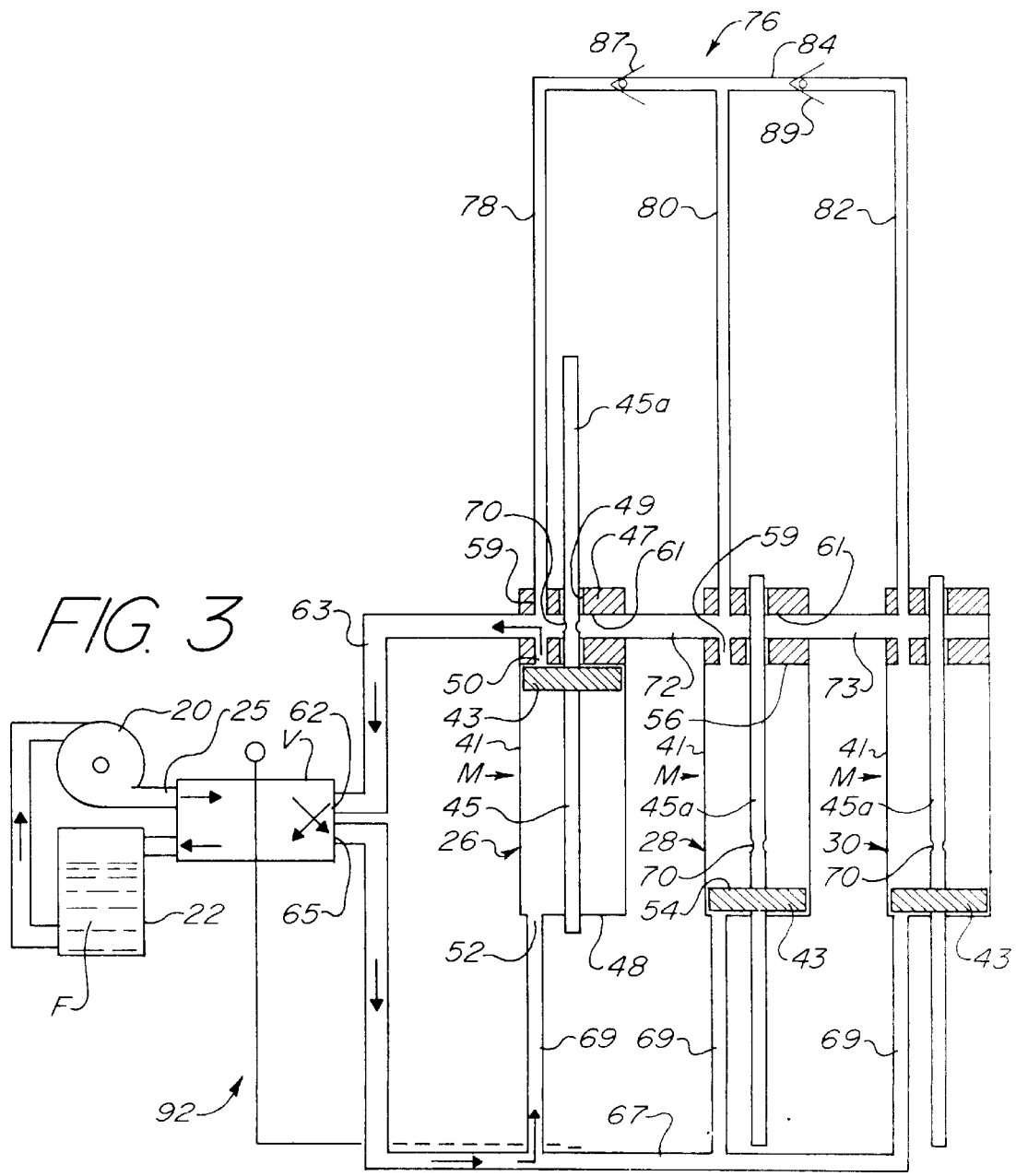

FLUID DRIVE FOR RECIPROCATING FLOOR

The present invention relates generally to reciprocating fluid drives, and, more particularly, to improvements in fluid drives that are specifically designed to operate reciprocating floors such as the reciprocating floor more particularly described in my U.S. Pat. No. 5,560,472.

BACKGROUND OF THE PRESENT INVENTION

1. Field of the Invention

There is currently a burgeoning of interest in reciprocating floors as a vehicle for the loading and unloading of both stationary storage facilities and mobile facilities such as tractor/trailers. Such trailers were typically open at the top and loading was very easy.

Whereas it was common in most locales about the country to load storage and transportable facilities, for particulate materials in particular, by use of a skip loader, or perhaps a conveyer, and even by blowing the material into the space, unloading of such facilities with that kind of equipment proved to be less convenient.

Moreover, with the advent of the passage of laws in many states requiring the covering of such loads, the time required to tarp and untarp a load of, for example, grain, must be figured into the total cost of shipment and storage.

As a consequence, covered vans or trailers actually provided a saving in labor and, coincidently, permitted the load to be enclosed, thereby minimizing losses of material. With the advent and development of reciprocating floors, labor and related costs were capable of being minimized, and the use of such systems has enjoyed great acceptance among shippers and growers alike.

The essence of such systems is the reciprocation of a series of contiguous parallel beams in a controlled sequence, and while there are a variety of more or less mechanical and even electrical systems, the use of fluid motors is perhaps the most efficient and trouble free.

While hydraulic systems are generally considered to be relatively less susceptible to damage from shock, reciprocating floors routinely experience damage to various moving parts, perhaps because of the transverse loading on the floor beams. It has been specifically determined that, as a consequence of the number of hydraulic pistons that are employed in reciprocating floor systems, all of which have to be continuouosly sequenced, that the system experiences a series of pressure surges, or spikes, which raise local system pressures to a multiple of pump output pressure, resulting in blow outs in the system. The consequential damage can result in a spectrum of malfunctions ranging from the premature opening of standard sequencing valves to literally shutting down the entire system. Repairs are both time consuming and expensive to the operator.

To a somewhat lesser extent, but no less debilitating, are accelerated wear problems and sealing problems. By virtue of the nature of the products handled by reciprocating floor systems, and the sensitivity of fluid systems to gritty materials and particulate generally, existing systems typically experience relatively frequent maintenance cycles and seal wear, which results in exaggerated loss of loads. Finally, valving in particular seems vulnerable to the higher level of macroscopic particulate which is inevitably present and airborne as the floor is operating.

2. Overview of the Prior Art

There appears to be a dearth of patent art directed at the driving or motivation of reciprocating floor systems. Most manufacturers have adopted existing technology to very simple systems which sometimes incorporate mechanical or electrical switching systems, with manufacturers and operators alike seemingly willing to give docile, yet grudging acceptance, to a maintenance and repair regime of relatively high frequency, with its attendant relatively high costs.

Referring to the Quaeck U.S. Pat. No. 5,222,593, a system for the hydraulic reciprocation of a reciprocating floor is disclosed, and it perhaps reflects the current wisdom in the industry. Quaeck makes it clear that systems such as that set forth in this specification have achieved recognition in the art as a specialized art.

In Quaeck there is a basic fluid motor acutated plan of operation for what Quaeck refers to as slats. In order, however, to sequence the motors to effect the appropriate operation of the reciprocating floor, each fluid motor is equipped with a fluid-driven timing cylinder, designated respectivly, CT1, CT2 and CT3, which are controlled by soleniod valves, (SV+a number), each having a number representing the cylinder being controlled. Separate limit switches (S+a number) are also provided to detect arrival of the slats at a predetermined position. All of these elements of the system are subject to wear and maintenance, and none provide the shock absorbsion, the absense of which tends to plague such systems due to the shock loading on the drive cylinder.

The use of valves, e.g., spool valves, is common in many hydraulic systems, and as seen in Taylor U.S. Pat. No. 5,297,575, a piston may be used in some applications as a rudimentary open/close switching element. Taylor, of course, relates to a pressure relief valve and has no application to the present invention. The present system, however, accomplishes the objectives attributed to it without resort to these techniques, as will be evident from a reading of the detailed description.

SUMMARY OF THE INVENT/ON

The present invention discloses a hydraulic motor in which sequencing is accomplished without the necessity of employing a separate switching valve operating in concert with the fluid motors which drives the several floor elements.

Such valves tend to malfunction, if not outright fail, when repeatedly subjected to the frequency and magnitude of shock developed by the fluid motors as they reach their respective ends of travel, particularly when under load. As a result, such valves are often the source of accelerated maintenance and related problems within a reciprocating floor environment. Not surprisingly, the elimination of such valves serves to accomplish an important objective of the present invention, namely the provision of a hydraulic system which has an extended maintenance cycle.

Another objective related to the foregoing is to minimize, if not eliminate, protracted down time by eliminating a switching valve which is susceptible to damage and malfunction in a high dust and macroscopic particulate environment.

Yet another objective of the present invention is to provide an efficient hydraulic drive system for a reciprocating floor that is simplified in its configuration and structure, thereby enhancing maintanence, and yet being highly reliable in operation.

A further objective of the invention, ancillary to the foregoing, is to provide a fully enclosed hydraulic system that is more readily shielded against and, thus, less susceptible to the adverse consequences incident to a relatively hostile dust permeated environment, thereby facilitating the implementation of other objectives of the invention.

An additional objective of the present invention is the provision of a hydraulic system which includes a greatly reduced spiking of hydraulic pressures and a cushioning of mechanical parts so as to extend the useful life thereof.

Having established the environment within which the invention has particular utility, it will become apparent that the structure of the present invention is eminently capable of meeting the stated objectives attributed to it, in addition to others which may occur, when the accompanying detailed description is read in conjunction with the immediately accompanying graphic illustrations of that structure in the drawings, wherein:

IN THE DRAWINGS

FIG. 1 pictorially illustrates the environment within which the present invention was developed to function, and a tractor pulling a van having a reciprocating floor is such an environment;

FIG. 2 illustrates, again pictorially, the interconnection of the hydraulic system of the present invention and the beams of a typical reciprocating floor;

FIG. 3 is a schematic of the hydraulic system of a preferred embodiment of the present invention, illustrating the initial step in the cycling of the reciprocating floor;

DETAILED DESCRIPTION OF A PREFERRED EMBODIMENT

Figure 4:
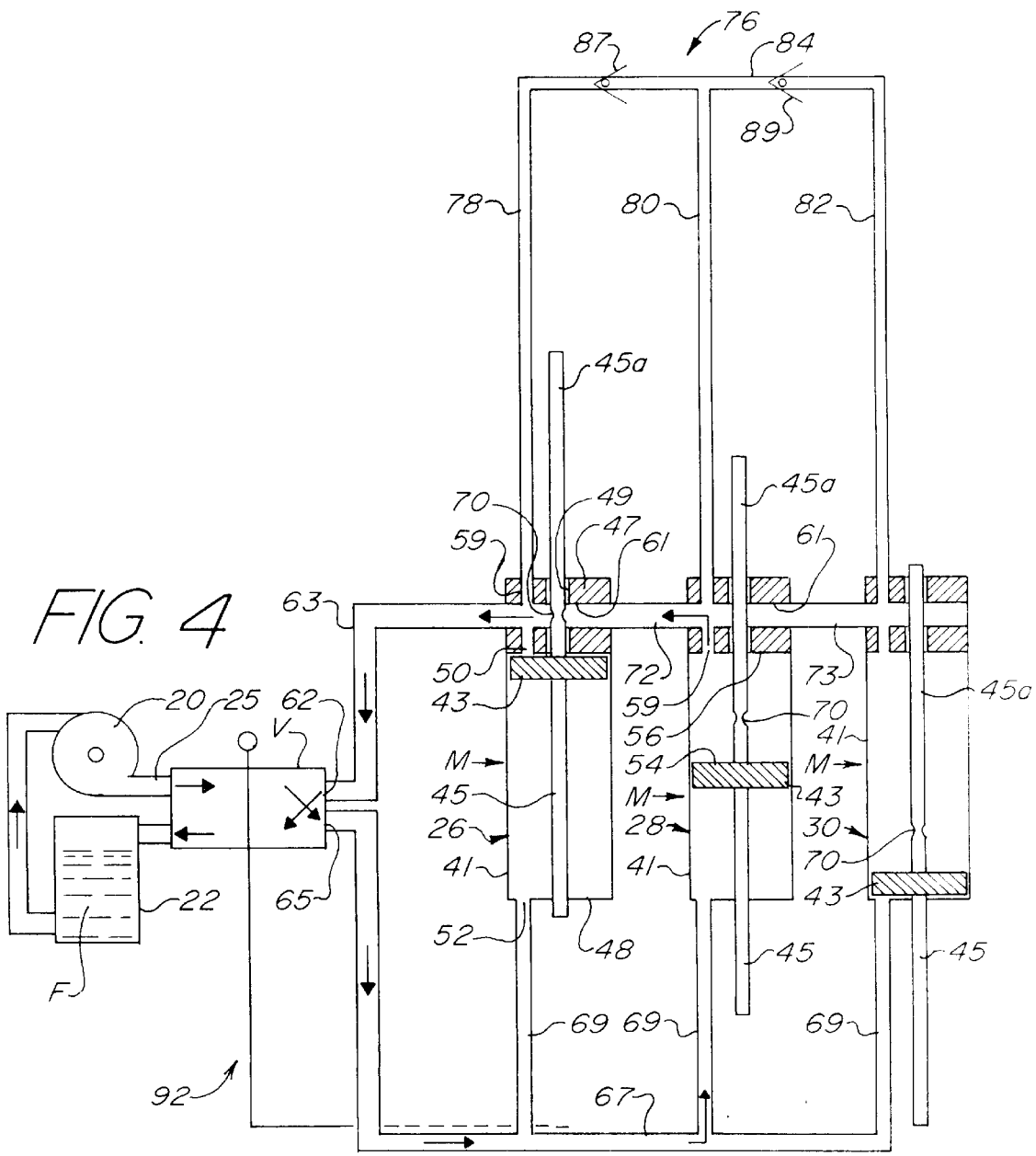
FIG. 4 is a view similar to that of FIG. 3, illustrating the next step in the progression of the operative cycle of the hydraulic system of the present invention.

With reference now to the drawings and initially to FIG. 1, a typical environment in which the present invention has particular, although not exclusive, utility is depicted in the form of a tractor trailer rig T. The trailer portion of the tractor trailer rig T is equipped with a reciprocating floor 15 which is of the type disclosed in my U.S. Pat. No. 5,560,472 issued Oct. 1, 1996.

It will be appreciated, however, that the trailer is merely illustrative of a space containing a load of material, or capable of containing a load of material. The present invention has equal value and application to a stationary room, bin, or space for the storage of particulate or similar materials.

As illustrated, the trailer portion of the tractor trailer rig T is loaded with a particulate material P, which may be a grain, or any one of several materials. It will be appreciated that the specific character of the load is not particularly germane to an understanding of the present invention.

Since the specification of the aforesaid patent on my reciprocating floor 15 provides an excellent description of the elements of the reciprocating floor and the interrelationship of the various operative parts, such description will not be duplicated here. The present invention is directed to a fluid motivated system for a series of contiguous parallel moving beams 17 of the floor reciprocating between a delivery and reset stroke, in a most efficient and simple manner, and the following description will focus on that fluid system.

With reference now to FIGS. 3 through 6, the system is illustrated schematically since, with one notable exception, the various elements of the fluid system are generally familiar to those skilled in the art. Thus, a source of fluid under pressure, in the nature of a pump 20, is provided and draws fluid F from a fluid reservoir, such as sump 22, through low pressure line 24 to the pump. The pump is connected by means of high pressure line 25 to a reversible selector valve V of known construction, through which fluid under pressure is directed, via a fluid delivery system or network to fluid motors as will be described in greater detail hereinafter.

The system of the present invention is characterized by an array of hydraulic motors M, three of which are depicted at 26, 28 and 30 viewing the system at FIG. 3. It will be readily appreciated that the precise number of motors will be dependent on the number of beams comprising the floor and the number of beams each motor is designed to drive. This structural concept is illustrated in FIG. 2 wherein each of the motors M, for example motor 26, is anchored to some stationary device such as the trailer floor. The motors M are also operatively connected in positive driving relation to the beams by mechanical apparatus which includes a clevis 32, secured to a rigid member such as, for example, a piston rod, projecting beyond the motor M and tied to a cross member 34. In order to provide a link to the floor beams, the cross member 34 attaches to one or more driver connectors 36, which engage the moving beams 17 in any well known manner, causing them to reciprocate along their longitudinal axes in the direction of the arrow A, in coordination with the motor to which each is attached.

Each of the fluid motors M is of substantially identical construction, familiar to those skilled in the art, wherein a piston is driven reciprocally within a cylinder by selective application of fluid under pressure to one side or the other of the piston. Like numerical designations, therefore, shall be given to like elements which comprise the motors.

Thus, referring specifically to each such motor, a cylinder 41 defines the chamber within which a piston 43 is disposed for reciprocal movement.

A rigid elongated rod 45, also referred to interchangeably as a piston rod, mounts and positions the piston 43 within, and for movement along, the longitudinal axis of the cylinder 41. It will be appreciated that the piston rod may be a single element passing through the piston, or a pair of elements axially aligned on either side of the piston. In either configuration, the rod is affixed to the piston 43 at the center thereof, and the axis of the rod is coincident with the longitudinal axis of the cylinder 41 and transverse to the plane of the piston 43.

Each cylinder is, of course, sealed at its respective terminal ends against fluid leakage and is provided with necessary porting to permit introduction of fluid under pressure to one side or the other of the piston and to exhaust fluid on the side opposite that to which motive pressure is applied. In the absence of the capacity to exhaust the fluid in that portion of the chamber not in direct communication with the pressure source, in this instance the pump P, the motor would lock up and could not function.

In order to support the piston and rod assembly in the cylinder for reciprocal movement, each piston rod 45 is journaled for reciprocal movement in the sealed ends of the cylinder, which sealed ends may be in the form of terminal end caps, respectively 47 and 48, shown in the drawings at the respective termini of each cylinder.

As may be seen in the drawings, the piston rods are more in the nature of piston guide rods, and it is incident to the invention that they are dimensioned to extend outwardly and beyond both termini of each cylinder such that upon full travel of the piston 43, by way of example, toward either end of the cylinder which they occupy, the piston rod invariably extends beyond the termini of such cylinder. It will be appreciated as the significance of the length of the rods becomes clear, that a separate rod, or other mechanical means, could also be used without departure from the invention.

In order to provide optimum efficiency in manufacture and maintenance capability, the end cap 47 is, in keeping with many of the objectives of the invention, formed with a centrally disposed guide bore 49 which journals the portion of the rod 45a which extends through it from the piston as seen, for example, in FIG. 3.

The closed fluid system of the present invention includes a sequencing system which is designed to cause the motors to execute a particular sequence in cycling the reciprocating floor between its load or product delivery position and its reset position. Briefly summarized, the delivery cycle is that cycle which causes the load on the beams to be moved toward a delivery point and effected when the beams are moved in unison toward that point in a series of short cycles, whether it be toward the interior or exterior of the space within which the reciprocating floor operates.

The reset position is achieved by simply reversing the application of fluid pressure on the piston to reverse the direction of movement of the piston, thereby moving the beams in the opposite direction, positioning the beams to execute another delivery stroke. That movement is accomplished by sequencing the fluid motors to return serially, such as in sequence, motors 26, 27 and finally 28, as shown, to the reset position from which the delivery cycle may be initiated.

In accomplishing the reset cycle, which is at the heart of the present invention, the present invention provides for a fluid supply system, which functions to deliver fluid under pressure, from a pressure source such as pump P, to one side of the piston in the motors, which are plumbed in parallel, and a fluid exhaust system which permits the area on the opposite side of each piston to be exhausted of the fluid in the cylinder on that side of the piston, in series, to the sump.

Now in reference to the exhaust system, and beginnning with the fluid motors at their delivery point and poised to cycle to the reset position, it will be appreciated that the fluid injected into the fluid motors to move them to the delivery position remains in the cylinder above the land 54 as seen, for example, in FIG. 3. In order to permit the discharge of exhaust fluid and, thus, relieve pressure above the pistion land 54 so that the piston 43 is able to advance toward the end cap 47, each end cap is formed, as part of the sequencing system, with a fluid port 50. The port 50 is offset relative to the axis of the bore 49 and, while shown to the left of the bore 49, may be positioned in any of several ways to permit efficient formation thereof.

Similarly, a fluid port 52 is formed at the end of the cylinder 41 opposite the end cap 47 in the cylinder end or termini 48. It will be understood that the end 48 may be integrally formed with the cylinder, or if manufacturing efficiency dictates, may be an end cap, or, for example, a closure such as end cap 47, all without departure from the invention.

Figure 5:
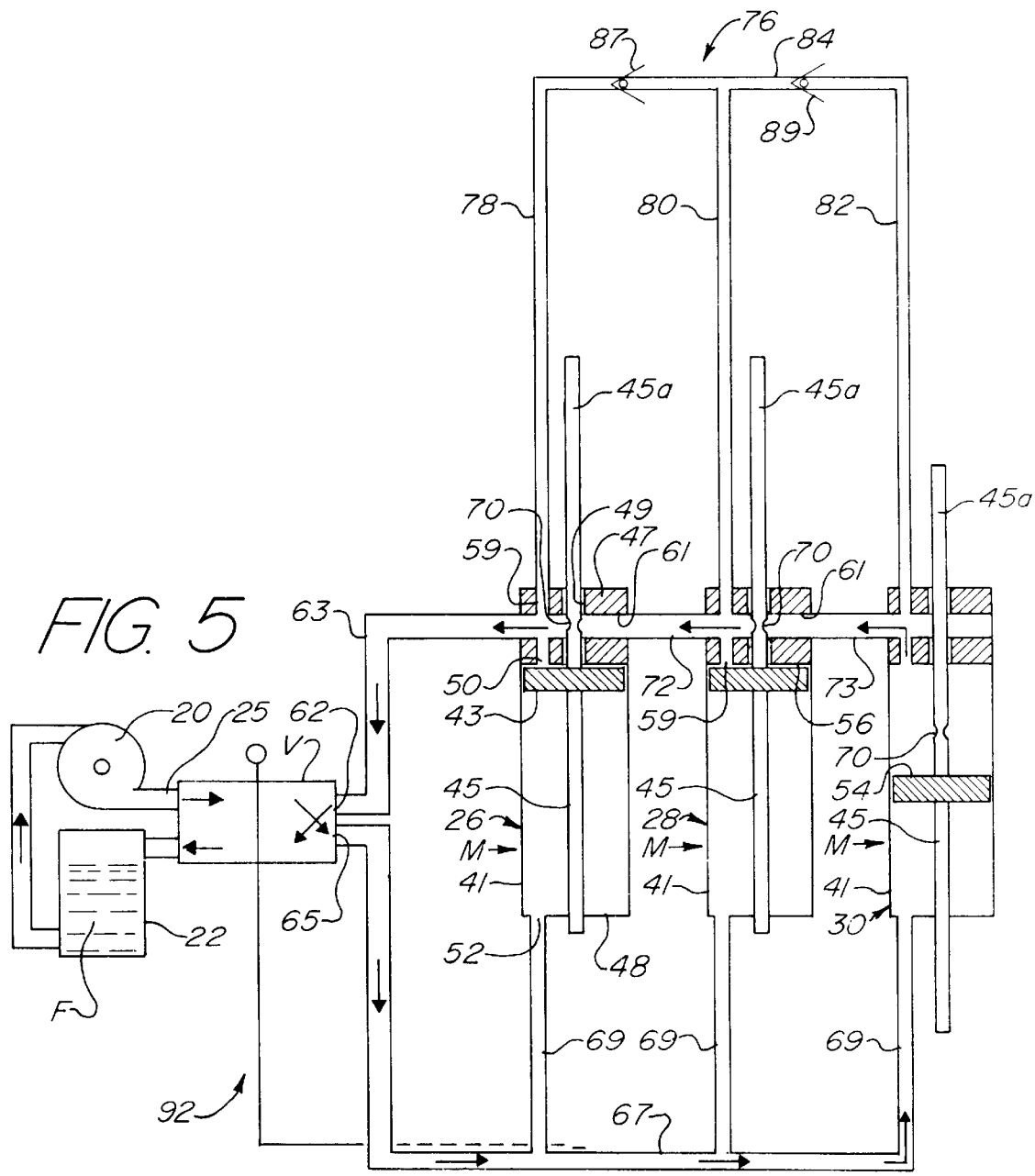
FIG. 5 is, once again, a view similar to FIG. 3, and again illustrating a third step in the progression of the operative cycle of the hydraulic system of the present invention.

With the motors in position to return to their reset position and as illustrated in FIGS. 3, 4 and 5, the selector valve V is moved to the position as shown, and the port 50 of motor 26 is in open communication between the fluid exhaust system and the sump 22, providing access thereto for fluid exhaust located above the land 54 of the piston and, coincidently, port 52 provides fluid communication between the pump and the land 56 of the piston through the fluid delivery, or supply, system. As a result, fluid under pressure enters the cylinder and impinges on the piston 43 to cause the motor 26 to begin its cycle, and it begins to move toward its reset position.

As noted previously, the present invention includes an exhaust system for permitting timely evacuation of fluid in the cylinders forward of the piston in the direction of movement so as to allow cycling of the motors. The fluid exhaust system of the FIG. 3 configuration, for example, includes an exhaust fluid return line 63, which is in serial communication with all of the ports 50 of the motors M.

While the exhaust fluid line may be entirely separate, the better approach, at least in terms of the invention, is illustrated in FIG. 3 by creating a passageway directly in the end cap 47 of each of the fluid motors M. Relative to the direction of flow of exhaust fluid in the exhaust return line 63 toward the sump, it will be seen that the sequencing order as shown is motor 26 first, followed by motors 27 and 28.

In order that the sequencing function of the system of the present invention can be implimented in the simplest and most efficient manner, it will be seen that the sequencing system includes means for selectivly blocking and unblocking the exhaust fluid line 63. To this end, the upper portion 45a of each of the rods 45 intersects and normally blocks the exhaust return line 63. Efficiency, therefore, may be optimized by establishing the exhaust line as close to the motors as is practical and, to this end, transverse passages 61 are formed, in any suitable fashion, in the end caps 47 of the motors. Thus, the rods 45a are well supported relative to the return line, and the passages 61 become part of the return line 63.

The transverse passages 61 formed in each of the various motors M, are themselves interconnected to complete the line, by any suitable means such as fluid lines 72 and 73.

In order that each piston can be serially moved within the cylinder of each of the motors to bring the beams of the floor connected to it to their reset position, the fluid delivery system provides fluid under pressure from the pump 20, through the valve V, through delivery line 65 to a manifold 67 which includes feeder lines 69 connected in parallel to the port 52 of each cylinder simultaneously, with the result that fluid under pressure is delivered to the land 56, to urge the piston forwardly, or upwardly as viewed in the figures. Movement in motor 26 has already been initiatied, as described above, as the valve V opens the return line 63 to the sump, and as will be now understood from a study of FIG. 3, and as the piston 43 in motor 26 moves toward its reset postion the rod 45a will move to a postion at which it will unblock the return line 63. In accomplishing the unblocking function, each of the piston rods, or portions thereof designated 45a, is formed with, or otherwise includes, a reduced diameter section 70.

More particularly, the reduced diameter section 70 which, as illustrated, is in the nature of a circumferentially formed conical recess or cavity, is precisely positioned on the rod 45a so that as the piston 43 of motor 26, the first motor in the sequence, arrives at the end of its stroke, which equates to the full extent of its upward movement as pictured in FIG. 3 of the drawings, the reduced diameter section 70 is positioned in the passage 61, thereby permitting fluid to bypass the rod 45a.

The reduced diameter section is dimensioned such that the depth of the recess increases from its outer limit to the center, and then decreases again to the outer limit. This configuration provides a cushioning effect in that as the piston in each motor approaches the top of its stroke, the section 70 progresses into the passage and a gradually increasing amount of exhaust fluid blow by is experienced. This feature has the effect of cushioning the shock which would otherwise be the inevitable consequence of the motor reaching its outer limits where the piston is otherwise rammed against the end cap under pressure. In this manner, the objective of increasing the useful life of the various motor parts by reducing shock is accomplished.

As the rod 45a of motor 26 seats at its reset position, as viewed in FIG. 3, the passage 61 in the end cap 47 thereof is open, and the port 50 in motor 28 is now open through line 63 to the sump. Coincidently, pressure above the piston having been relieved, the piston in motor 28 begins to move toward its reset position, and as it arrives, the passage 61 in motor 28 is opened, and pressure is relieved in the same manner in motor 30. Sequencing in accordance with the invention is, thus, achieved.

It will be appreciated that the pistons move to the reset position at a rate permitted by the volume of fluid that can exit the cylinder through the reduced diameter port 50 and past the reduced diameter portion 70 in the return line 63, per unit of time, and, thus, the piston will reach and be stopped by the endcap less rapidly and with a fluid cushion not peviously available in the art.

In an effort to minimize the amount of plumbing required, the invention contemplates the provision of a back flow system which is intended to insure that the fluid exhausted from the cylinders does not back flow into previously exhausted cylinders. The same system serves as a delivery system for directing fluid under pressure to the motors in unison to effect execution of the delivery stroke.

Figure 6:
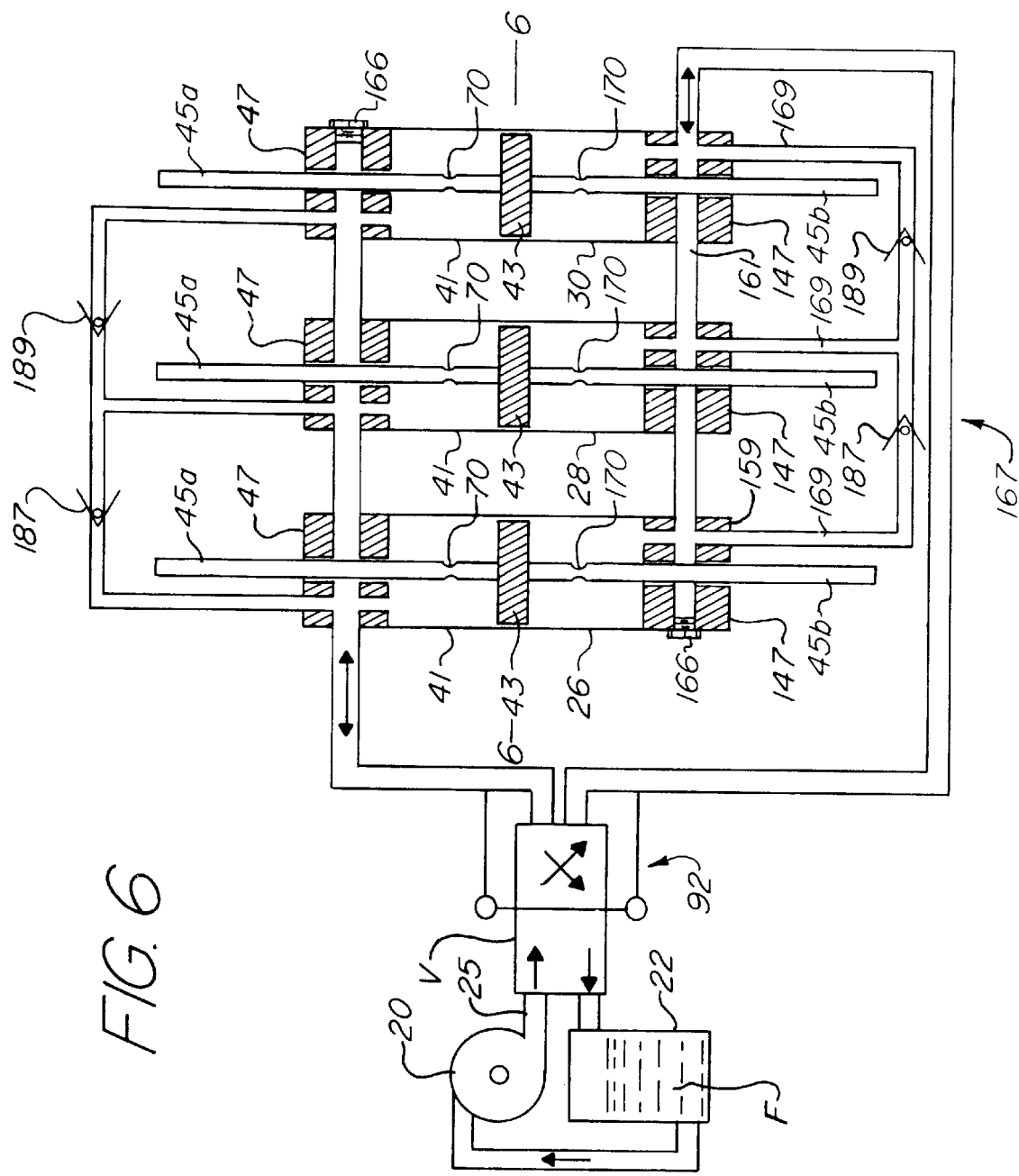
FIG. 6 is illustrative of a system, constructed in accordance with the present invention, and which is capable of executing both loading and unloading maneuvers in both directions.

Once all of the fluid motors are at their upper limits and, thus, in the reset position, as seen in FIG. 6, the valve V is reversed, thereby connecting the pump to the line 63. The back flow system 74 includes a manifold 76 which connects to the motors 26, 28 and 30 by means of the longitudinal passages 59 of each through feeder lines 78, 80 and 82.

In order to assure that fluid flowing into the manifold 76 moves in the desired direction, check valves 87 and 89 are strategically positioned in the manifold connector line 84, with the check valve 87 being positioned between feeder lines 78 and 80 and the check valve 89 between feeder lines 80 and 82. By virtue of this configuration, fluid from the motor 28 can not pass into line 78, and, in like fashion, the check valve 89 is positioned in connector 76 to inhibit flow between line 82 and line 80. Accordingly, all of the fluid forced out of the cylinders as they are moved toward the reset position is exhausted to the sump.

It will be appreciated that when the valve V is reversed, setting the system to its delivery mode, fluid from the pump fills the manifold 74 through line 63 and the longitudinal passage 59 of motor 26 with the result that fluid under pressure is applied uniformly and simultaneously to the lands 54 of each of the pistons 43, causing them to move in unison toward the unload position of the system. In consequence of the movement just described, the entire reciprocating floor is moved toward the unloaded position, and the load on the beams 17 is advanced toward the end of the area where the contents is to be unloaded. This process constitutes a complete cycle of the system in accordance with the invention. Upon completion of that stroke, the valve V is again reversed, and the described cycle repeats. The number of cycles required to complete the process is dependent on several factors, such as the length of the stroke.

In order to make the entire sequence automatic, a switching device is provided, indicated schematically at 92. The switch may take one of several well known mechanical or non mechanical forms, including a simple servo mechanism actuated by a micro switch or the like, or it may be mechanical, as a matter of choice and without departure from the essense of the invention, and, therefore, no detail is provided with respect to the specific switching device at this time, since it may be one of many well known such devices. Suffice it to say that when all of the pistons reach the top most position as seen in the drawings, the valve V is reversed to permit fluid under pressure from the pump P to communicate with the line 63, and, conversely, when all of the pistons are moved to the bottom as seen in FIG. 6, the valve V is again reversed.

In some applications, it may be desirable to pemit the reciprocating floor to be cycled to load and unload in either direction. This is capable of being accomplished, in accordance with the present invention, by replicating the hydraulic system so that it is substantially dublicated at either end of the fluid motors.

With reference, therefore, to FIG. 6, such a hyraulic system, modified to meet this versatile application, is illustrated wherein the system essentially comprises two substantially identical FIG. 3 systems, which when compared along line 6—6, are effectively a mirror image of one another.

In establishing this configuration, an end cap 147, which is substantially identical to the end cap 47, is fitted to each cylinder in place of the end 48 of the FIG. 3 configuration. Each end cap 147 has parallel longitudinal passages 149 and 159, and a transverse passage 161, with each of the transverse passages 161 being fluid interconnected by lines 1 72 and 1 73 to define a portion of a fluid exhaust line 163. By using the endcaps 147, introduction of a manifold system 174 to the lower end (as depicted in FIG. 3) of each of the motors is permitted.

Now, therefore, by connecting the transverse passages 161 to one side of the valve V, rather than directly into the cylinders as is done in the FIG. 3 configuration, and by providing a reduced diameter section 170 on the piston rod 45b, sequencing of the motors in an upward direction is possible, and, thus, the system is operable in either direction at the discretion of the operator. Consequently, the reciprocating floor has the capacity to both load and unload.

In order to selectively deliver and exhaust fluid from the motors 26, 28 and 30, fluid line 163 is in fluid communication with transverse passages 160, the lower end caps 147 as viewed in FIG. 6, and the switchable valve V. Further, in order to provide fluid communication between and among the fluid motors, a manifold 167 is provided, and formed or otherwise provided with longitudinal passages 169.

As the FIG. 3 embodiment, a reduced diameter portion 170 is formed on the portion of the piston rod or ram 45b, so spaced from the piston 43 that it will be disposed within the transverse fluid passage when the piston is in contact with the lower end cap 147.

The manifold 167 and, in this alternative configuration, the manifold 67 is fitted with pilot check valves 187 and 189. The pilot check valves are of known construction, one version of which is manufactured by the Sun Corporation, and are particularly suited for use in this system because the valve can be selectively opened by fluid pressure applied to it, thereby permitting fluid to flow in both directions throught the valve upon command.

The valve V now includes a selector which permits the operator to choose the direction in which the load is to be moved and by electing to apply fluid pressure through the line 167, the system will operate as described with respect to FIGS. 3, 4 and 5, with the exception that the reciprocating floor will move the load inwardly, away from the discharge end D.

In the description just completed, the valve V is reversed by mechanical means as one way of actuating the valve. Clearly, however, other actuation devices are contemplated without departure from the invention.

Figure 7:
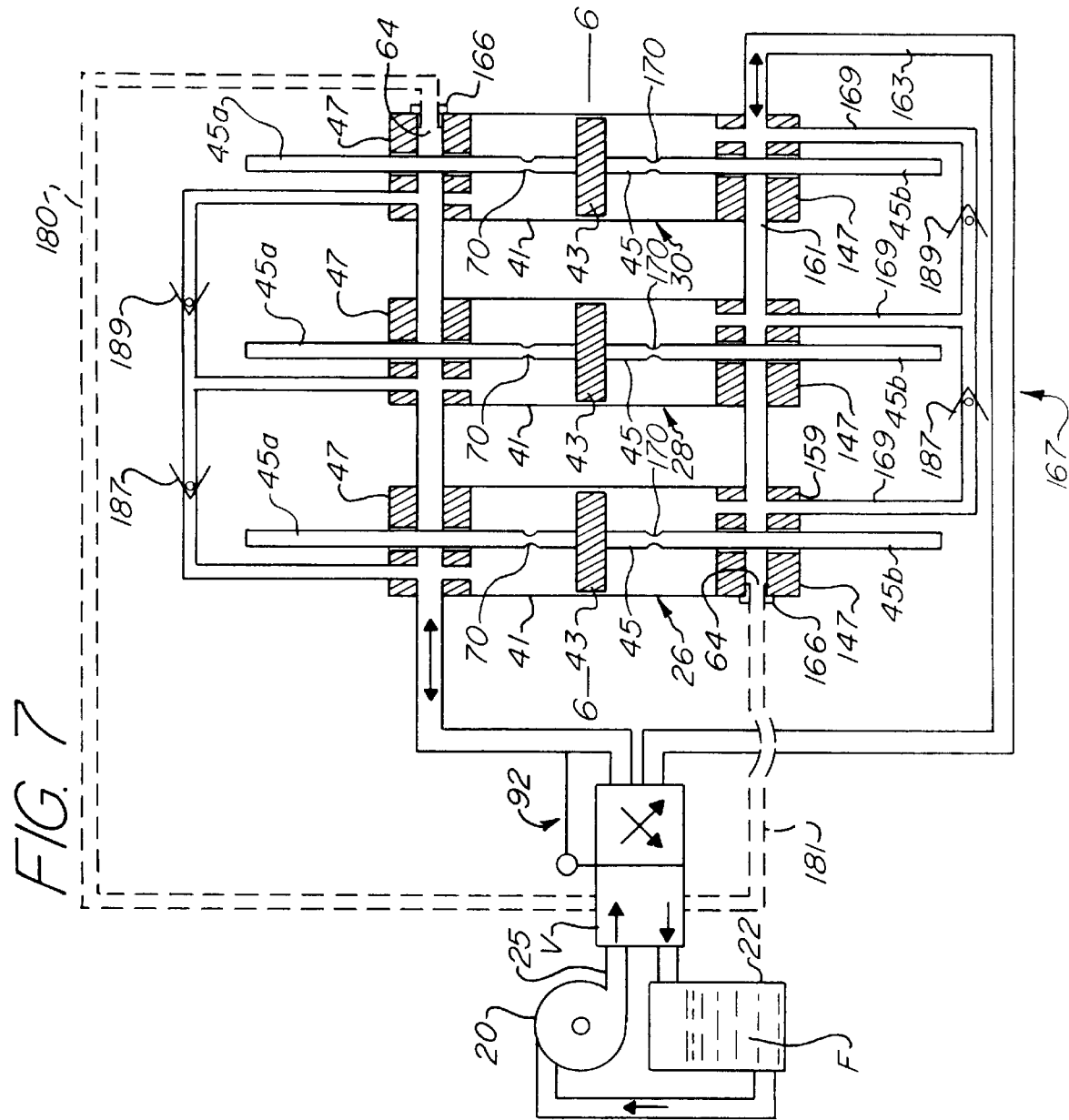
FIG. 7 illustrates a system similar to that of FIG. 6, with the additional feature that the switching valve is hydraulically sequenced, rather than mechanically.

Thus, and with reference to FIG. 7, a variation on the theme of FIG. 6 is illustrated and is viewed in conjunction with the following description. Now with reference to FIG. 6, it will be noted that the transverse passages 61 and 161 extend the entire diameter of the end caps 47 and 147. This is the result of engineering convenience and efficiency in drilling or otherwise forming the passages. In order to close the passage where the port is free, as at 64, and not attached to a fluid line, plugs 166 are pressed, or otherwise affixed to the free ports 64, thereby sealing them against the inadvertent escape of fluid.

The existence of free ports 64 provide the basis for operating the valve V by means of application of appropriate fluid pressure. Thus, as seen in FIG. 7, fluid lines 180 and 181 are affixed between the valve V and the ports 64 so as to transmit fluid under pressure to the valve V. The valve is modified from the FIG. 6 version only to the extent that a fluid operated servo motor of known construction and operation is substituted for the mechanical switching mechanism, and the servo (not specifically illustrated since it is within the valve body) senses pressure from the lines 180 and 181 to switch the valve to reverse communication between fluid in the motors and the pump P to reverse direction of the motors.

Having now described a preferred embodiment of the present invention, and a means by which it can become rendered operative to load and unload the area encompassed by the reciprocal floor, in either direction, what is claimed is:

1. A closed fluid drive system for cycling a series of coplanar, contiguous, reciprocable beams together comprising a reciprocating floor, between a delivery stroke in which the action of the beams is in unison to deliver a load thereon to a delivery point, and a reset stroke in which the beams are moved sequentially to a reset position without moving the load thereon, in preparation for executing a delivery stroke, said fluid drive including:

a source of pressurized fluid; a sump for receiving exhaust fluid;

an array of fluid motors, each said fluid motor being operatively connected to at least one beam, said fluid motors having a piston, a piston rod drivingly connected to said piston, and being sequentially moveable from a delivery position to a reset position, and returnable in unison to the delivery position, said fluid motors having at least one end cap therein; each said end cap having a transverse passage therein, said transverse passage being selectively blocked by movement of said piston and said piston rod;

a selector valve, said selector valve connected respectively to said fluid source, said sump, and said fluid motors, and being switchable to selectively direct fluid flow to and from said fluid motors to cause movement thereof;

a fluid delivery system interconnecting said selector valve, and said fluid motors, for delivering fluid under pressure to said fluid motors;

a fluid exhaust system interconnecting said fluid motors seriatim, and said sump for exhausting fluid from said fluid motors;

a sequencing system integral with said exhaust system for exhausting said fluid motors in sequence whereby said fluid motors are moveable one at a time to their reset position.

2. The novel system of claim 1, wherein said sequencing system includes means moveable with each fluid motor to sequentially block and unblock said exhaust system so as to allow each fluid motor to be exhausted to said sump in a predetermined order.

3. The novel system of claim 1, wherein the operative connection between each fluid motor and at least one beam includes a rigid member, said rigid member intersecting and passing through said exhaust system, and being moveable to block and unblock said exhaust system to selectively exhaust said fluid motors in sequence.

4. The novel system of claim 3, wherein said rigid member is formed with a recessed section, said recessed section being moved into and out of said exhaust system as said fluid motor reciprocates, so that said exhaust system is unblocked as said recessed section is moved into said exhaust system, and said exhaust system is blocked as said recessed section is moved out of said exhaust system.

5. The novel system of claim 4, where in said recessed section is graduated in depth from its outer limits to a maximum depth near the center thereof such that the exhaust fluid passing thereby is increased as said rigid member moves through said exhaust passage, whereby said fluid motor is cushioned against shock as it reaches the limits of its travel.

6. The novel system of claim 3, wherein said rigid member comprises a rod, said rod being reciprocable by said fluid motor, said rod having a reduced diameter portion, said fluid exhaust system including an exhaust return line, said exhaust return line being connected to each said fluid motor in series;

said rod intersecting said exhaust return line to nominally block said exhaust return line to prevent exhaust fluid from passing therethrough, and moveable to a position in which said reduced diameter section intersects said exhaust return line to unblock said line, thereby allowing exhaust fluid to pass therethrough.

7. The novel system of claim 6, wherein said reduced diameter is a conical recess.

8. The novel system of claim 6, wherein said rods unblock said exhaust return line in sequence so that said beams are returned to said reset position in sequence.

9. The novel system of claim 8, wherein said rigid member is formed with a recessed section, said recessed section being moved into and out of said exhaust system as said fluid motor reciprocates, so that said exhaust system is unblocked as said recessed section is moved into said exhaust system, and said exhaust system is blocked as said reduced section is moved out of said exhaust system.

10. A closed fluid drive system for cycling a series of coplanar contiguous reciprocable beams together comprising a reciprocating floor, between a delivery stroke in which the action of the beams is in unison to deliver a load thereon to a delivery point, and a reset stroke in which the beams are moved sequentially to a reset position without moving the load thereon, in preparation for executing a delivery stroke, said fluid drive including:

a source of pressurized fluid; a sump for receiving exhaust fluid;

an array of fluid motors, each said fluid motor being operatively connected to at least one beam, said fluid motors having a piston, said piston having a piston rod being sequentially moveable from a delivery position to a reset position, and returnable in unison to the delivery position, said fluid motors having at least one end cap therein; each said end cap having a transverse passage therein, and said piston rod intersecting said transverse passage;

a selector valve, said selector valve connected respectively to said fluid source, said sump, and said fluid motors, and being switchable to selectively direct fluid flow to and from said fluid motors to cause movement thereof;

a fluid delivery system interconnecting said selector valve and said fluid motors for delivering fluid under pressure to said fluid motors;

a fluid exhaust system interconnecting said fluid motors seriatim, and said sump for exhausting fluid from said fluid motors; said fluid exhaust system including a fluid exhaust line; said passage in said end cap comprising a portion of said fluid exhaust line;

sequencing means including said piston rod integral with said exhaust system for exhausting said fluid motors in sequence; and means for switching said selector valve to reverse the same in response to the arrival of said fluid motors at their reset and delivery positions, whereby said fluid motors are moveable one at a time to their reset position.

11. The novel system of claim 10, wherein said switching means is nonmechanical.

12. The novel means of claim 10, wherein said sequencing system includes means moveable with each fluid motor to sequentially block and unblock said exhaust system so as to allow each fluid motor to be exhausted to said sump in a predetermined order.

13. The novel system of claim 10, wherein said piston rod is formed with a recessed section, said recessed section being moved into and out of said exhaust system as said fluid motor reciprocates, so that said exhaust system is unblocked as said recessed section is moved into said exhaust system, and said exhaust system is blocked as said recessed section is moved out of said exhaust system.

14. The novel system of claim 13, wherein said recessed section is graduated in depth from its outer limits to a maximum depth near the center thereof such that the exhaust fluid passing thereby is increased as said piston rod moves through said exhaust passage, whereby said fluid motor is cushioned against shock as it reaches the limits of its travel.

15. The novel system of claim 10, wherein said rigid piston rod comprises a rod, said rod being reciprocable by said fluid motor, said rod having a reduced diameter portion, said fluid exhaust system including an exhaust return line, said exhaust return line being connected to each said fluid motor in series, said rod intersecting said exhaust return line to nominally block said exhaust return line to prevent exhaust fluid from passing therethrough, and moveable to a position in which said reduced diameter portion intersects said exhaust return line to unblock said line, thereby allowing exhaust fluid to pass therethrough.

16. The novel system of claim 15, wherein said reduced diameter portion is a conical recess.

17. The novel system of claim 1, wherein said closed fluid drive system is switchable to reverse the direction of said reset stroke and the said delivery stroke.

* * * * *